July 4, 1933.   A. L. HESTON   1,916,422
TIRE SHAPING MACHINE
Filed May 31, 1929   2 Sheets-Sheet 1

INVENTOR
Allen L. Heston
BY Walter L. Piper
ATTORNEY

July 4, 1933.  A. L. HESTON  1,916,422
TIRE SHAPING MACHINE
Filed May 31, 1929  2 Sheets-Sheet 2
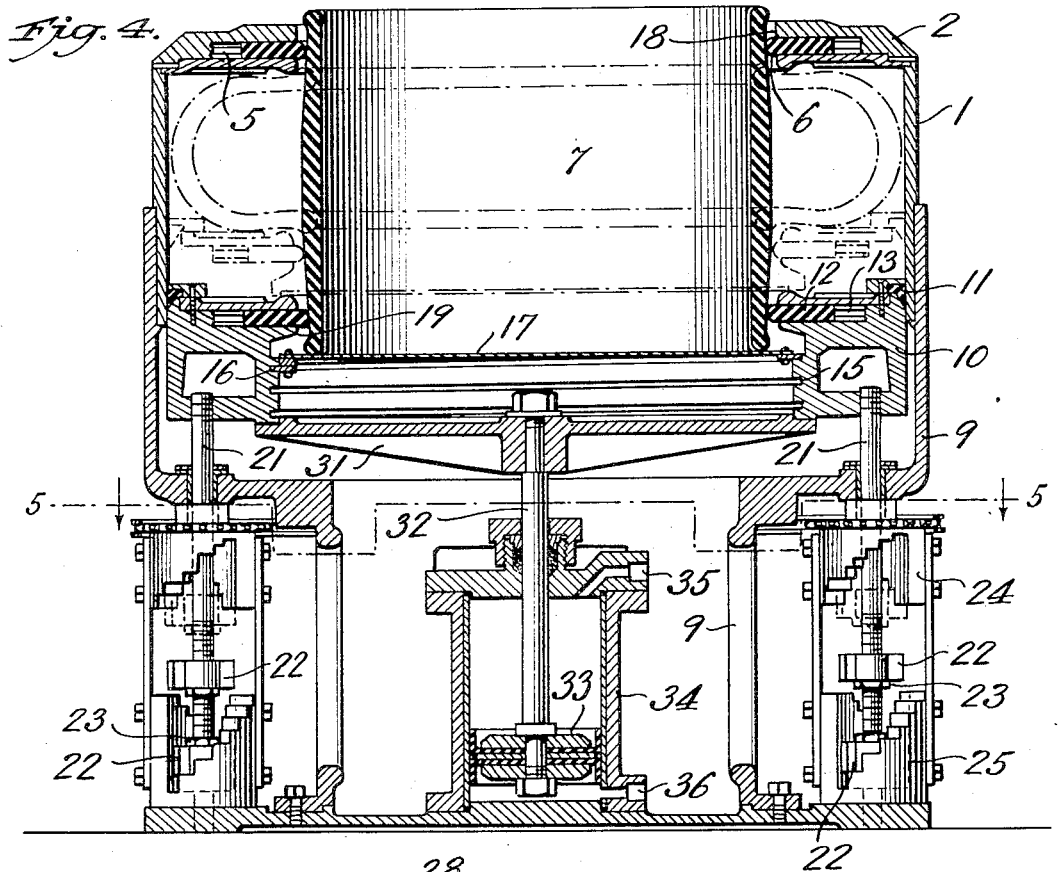
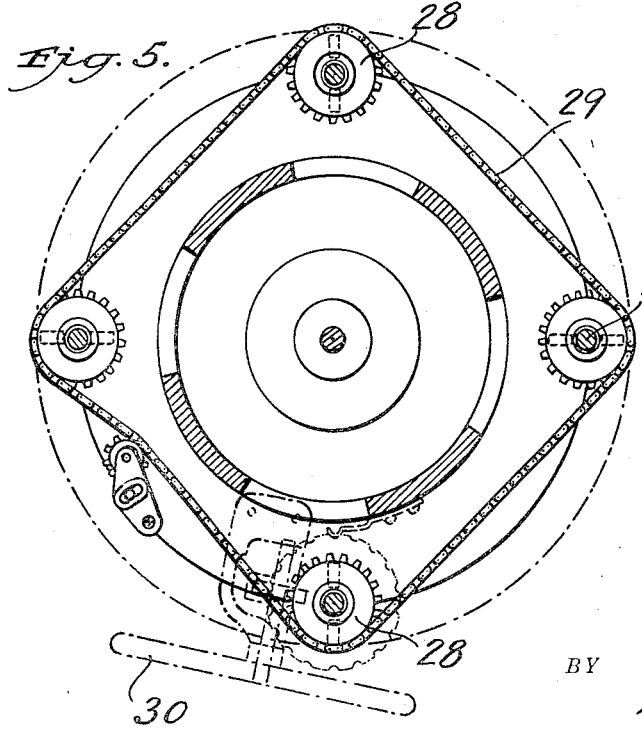
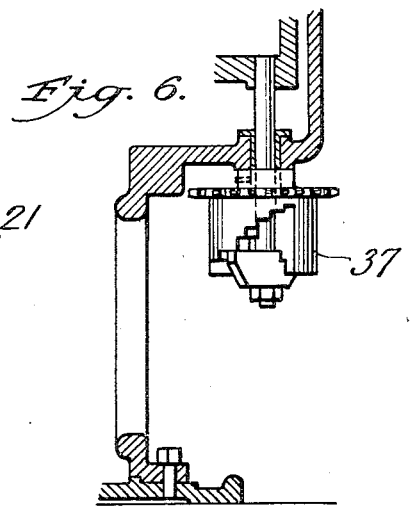
INVENTOR
Allen L. Heston
BY
ATTORNEY Patented July 4, 1933

1,916,422

UNITED STATES PATENT OFFICE

ALLEN L. HESTON, OF COLUMBIANA, OHIO, ASSIGNOR TO UNITED STATES RUBBER COMPANY, OF NEW YORK, N. Y., A CORPORATION OF NEW JERSEY

TIRE SHAPING MACHINE

Application filed May 31, 1929. Serial No. 367,503.

This invention relates to the art of tire building and specifically to a machine for shaping pulley bands into tire casings.

In the art of tire building as at present practiced, the constituent elements of a tire are assembled upon a drum so as to form an endless band known as the pulley band. The pulley band may be shaped into a tire casing by a device for creating a differential of fluid pressure acting upon the walls of the pulley band whereby it is expanded into tire shape. Certain of such devices are known as vacuum boxes.

It is the object of this invention to provide an improved form of vacuum box which rapidly expands pulley bands into tire shape in a novel manner. It is also the object of this invention to provide a device for shaping pulley bands into tire casings which is quickly, easily and economically adjustable to accommodate pulley bands of various sizes. It is also the object of this invention to provide a device for shaping pulley bands into tire casings which is adjustable in a variety of ways at the will of the operator to thereby render the device adaptable to the building of many different sizes of tires and to thereby also minimize equipment costs and space.

Other objects and advantages of the present invention will appear from the following detailed description taken in connection with the accompanying drawings in which:

Fig. 4 is a vertical diametrical section through the vacuum box with the pulley band inserted therein, certain of the parts being in elevation.

Fig. 5 is a cross section taken on the line 5—5 of Fig. 4.

Fig. 6 is a detail view partly in section showing a modification of the invention.

Figure 1:
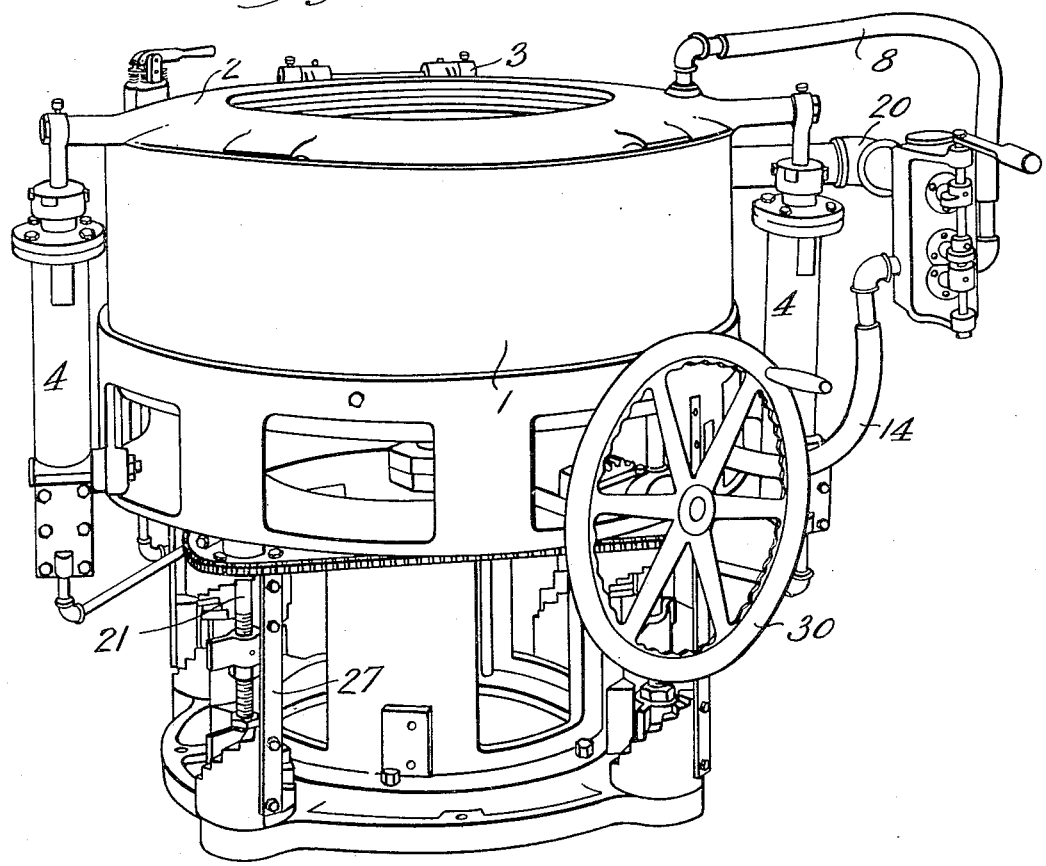
Fig. 1 is a perspective view of the complete machine.

The device for shaping pulley bands into tire casings comprises a casing 1 provided with a top wall 2 hingedly mounted thereon as indicated at 3. Suitable pneumatically operated pistons contained in cylinders 4 are provided for opening and closing the top wall 2. The top wall 2 is provided with a circumferentially extending groove 5 into which fits the elastic ring 6. The elastic ring 6 is provided to effect a preliminary seal between a pulley band, such as shown at 7, when the pulley band is first inserted within the vacuum box. Suitable pipe connections such as 8 are provided for connection to a source of reduced pressure whereby the ring 6 may be drawn into the groove 5 to facilitate the insertion of the pulley band within the casing. The casing 1 is supported in a suitable frame 9.

The casing 1 is provided with a lower movable wall 10 which is fitted into the casing 1 in sealed relation thereto by the sealing ring 11. The lower movable wall is provided with an elastic ring 12 fitted into the circumferentially extending groove 13 which, in all respects, is like the elastic ring 6 and circumferentially extending groove 5 in the top wall 2. Suitable pipe connections 14 lead from the groove 13 to a reduced source of pressure for the purpose pointed out in connection with the description of the elastic ring 6.

The lower movable wall 10 is provided with the spiral groove 15 into which the lugs 16 fit. The lugs 16 are attached to and support the supporting plate 17 upon which the pulley band 7 may rest when it is first inserted into the vacuum box. The spiral groove 15 is provided so that the supporting plate 17 may be adjusted in a direction parallel to the axis of the apertures 18 and 19 in top plate 2 and the bottom plate 10 respectively so that the pulley band will occupy a proper position with respect to the sealing rings 6 and 12 when it is inserted through the apertures 18 and 19 into the vacuum box.

The casing 1 with its top wall 2 and bottom wall 10 form a closed chamber about the pulley band when a pulley band has been inserted into the machine. The interior of the casing 1 is connected to a suitable evacuating device or other source of reduced pressure by pipe connection 20. Upon reduction of the pressure within the casing 1 the pulley band is acted upon by atmospheric pressure which forces it into the shape shown in dot and dash lines in Fig. 4. During the operation of expanding the pulley band, the bottom movable wall 10 moves upwardly in the casing 1 in a manner as to follow the expansion of the pulley band so that there is little or no sliding of the pulley band with respect to the top and bottom walls of the vacuum box. This action facilitates the expansion of the pulley band and also results in a more nearly perfectly shaped tire casing.

The maximum distance or separation between the top wall 2 and the movable bottom wall 10 which is appropriate to the successful operation of the machine is governed by the size or width of the pulley band and the minimum distance of separation between the walls 2 and 10 is determined by the size of the shaped tire casing which is of course governed by the size of the pulley band. It is for the purpose of adapting the machine of this invention to the expansion of pulley bands of various widths as well as diameters that the movable construction of the bottom wall 10 has been provided. The elastic rings 6 and 12 contract and expand to suitable diameters so as to render the machine adaptable to various diameters of pulley bands.

Figure 2:
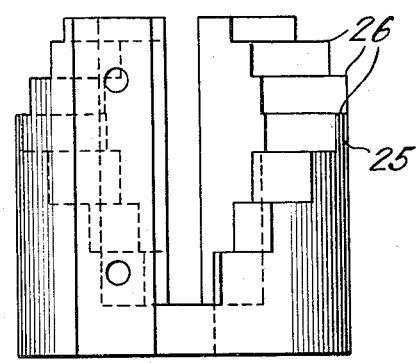
Fig. 2 is a detail view in elevation showing a stop member.
Figure 3:
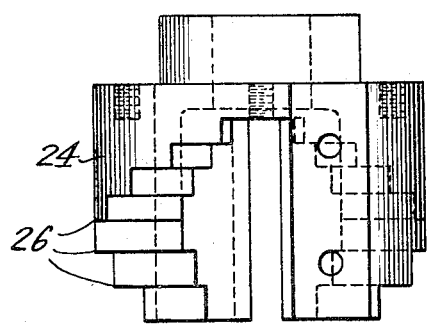
Fig. 3 is a view similar to Fig. 2 of another stop member.

In order to adapt the machine of this invention to pulley bands of various widths, suitable means for determining the maximum and minimum distances of separation between the top wall 2 and the bottom wall 10 have been provided. The bottom movable wall 10 is provided with connecting members or rods 21 at various points around its circumference, there being four of such rods 21 in the embodiment herein disclosed, although the number of rods may be varied as will be obvious. The rods 21 carry blocks in the form of wing nuts 22 threaded on to the shafts 21. These wing nuts are adjustable vertically on the rods 21 and may be fixed in adjusted position by any suitable means such as the lock nuts 23. Although one of the wing nuts 22 may be sufficient for the purpose of this invention, it is preferred to provide two of the wing nuts, which may be adjusted to any suitable distance of separation. The wing nuts 22 cooperate with stop members 24 and 25 best shown in Figs. 2 and 3. Stop members 24 and 25 are provided with stepped faces 26 with which the faces of the wing nuts 22 are adapted to cooperate. The stop members 24 and 25 are in the form of cylinders and the stepped faces are arranged in the walls thereof. The stop members 24 and 25 as shown in Figs. 1 and 3 are connected rigidly by the straps 27 suitably bolted thereto. The units consisting of the stops 24 and 25 united by straps 27 are mounted to rotate freely about the rods 21 and sprockets 28 are provided upon the stop members 24 which sprockets are interconnected by the chain 29. One of the sprockets 28 is driven by a suitable hand wheel and worm wheel mechanism indicated generally at 30 whereby all of the units consisting of the connected stop members 24 and 25 may be simultaneously rotated. The rotation of the units of the stop members brings the various stepped faces of the units into such position as to cooperate with the wing nuts 22 so that by adjusting the stop units to various positions, the maximum and minimum distances of approach of the bottom wall 10 to the top wall 2 of the vacuum box may be varied, the maximum distance being determined by the particular step in the stop member 25 with which the corresponding ring nut cooperates, and the minimum distance being determined by the particular step on the stop member 24 with which the corresponding wing nut 22 cooperates. The preliminary adjustment prior to the continuous operation of the machine may be made by properly positioning the wing nuts 22 along the rods 21. After such preliminary adjustment has been made the maximum and minimum distances of separation between the top and bottom plates 2 and 10 respectively is effected with great facility by manipulating the stop units composed of members 24 and 25.

In order to move the bottom wall 10 to a position where the wing nuts 22 will not interfere with the adjustment of the stop units 24, 25, the bottom wall 10 is provided with the spider or other suitable connecting device 31 which connects the bottom wall to the piston rod 32 leading to the piston 33 in the cylinder 34. Suitable sources of pressure are connected to the cylinder 34 through pipe connections, not shown, attached to the orifices 35 and 36. It is evident that the application of fluid pressure through the orifice 36 will lift the bottom wall 10 so that the stop units 24 and 25 may be adjusted. The piston 33 and cylinder 34 not only provides a means for positioning the bottom wall 10 as desired by the operator but it also acts as a dash-pot controlling the velocity of the motion of the bottom plate 10 when it is drawn upwardly by the action of the reduced pressure within the casing 1 during the expansion of the pulley band into tire shape.

A modification of the invention is shown in Fig. 6 in which only one stop member 37 is provided which limits the minimum distance of separation between the top wall 2 and the bottom wall 10. The stop member 37 shown in Fig. 6 is but one of a plurality of such stop members arranged around the circumference of the machine, which stop members are simultaneously controlled by a chain and suitable drive such as provided for the first described embodiment of the invention as shown in Fig. 5. In the modification of Fig. 6 the piston 34 and cylinder 35 are employed for an additional function, that is, by the application of fluid pressure through the orifice 36 the bottom wall 10 of the vacuum box is adjusted to a proper position of maximum separation between the top wall 2 and bottom wall 10 so as to adapt the machine to pulley bands of various widths.

In the operation of the machine with the parts shown in the position in Fig. 4 the elastic rings 6 and 12 are withdrawn into the circumferential grooves 5 and 13 by connection of the grooves with a suitable source of reduced pressure whereby the pulley band 7 is inserted within the casing and allowed to rest upon the bottom plate 17 which has been adjusted to a proper position. After insertion of the pulley band the reduced pressure acting in the grooves 5 and 13 is released so that the elastic rings 6 and 12 may contract into contact with the pulley band thereby effecting a seal therewith. The interior of the vacuum box is then evacuated through any suitable source of reduced pressure which results in a differential pressure due to the atmospheric pressure which causes the pulley band to be expanded into the shape as shown in dot and dash lines in Fig. 4. As the expansion of the pulley band progresses, the lower wall 10 is moved upwardly by the action of atmospheric pressure so that it follows the pulley band thereby preventing any slipping between the pulley band and the walls of the vacuum box. A curing bag is inserted within the shaped tire casing and bead rings or bull rings clamped thereon and the assembled tire casing and curing bag manually removed from the vacuum box after the top wall 2 has been rotated upwardly by the action of the pneumatic pistons contained in cylinders 4.

Assuming that the following pulley band be of a different size the lower wall 10 is raised by the action of fluid pressure through the orifice 36 and cylinder 34 and the stop units 24, 25 are rotated to a different position by the hand wheel 30 which position gives an adjustment of the vacuum box corresponding to the size of the pulley band. After adjustment of the stop units 24, 25 the pressure acting on the piston 33 is released so that the lower wall 10 drops into the position of maximum displacement with respect to the top wall 2 whereupon the pulley band is inserted and the operation of the machine carried out as above described.

In the instance of the modification shown in Fig. 6 the operation of the device is the same in all respects except that the adjustment of the lower wall for pulley bands of different sizes is made by the application of pressure to the orifice 36 into the cylinder 34.

While this invention has been described as being applied to a pulley band expanding machine of the type which employs a reduced pressure to build up a differential pressure due to the atmospheric pressure acting upon the pulley band and tending to expand the same into tire shape, it is not necessarily so limited. The invention may be applied to that type of pulley band expanding machine in which the differential pressure acting upon the pulley band may be created by applying a closing member over the top of the pulley band and forcing fluid under pressure into the interior of the pulley band. With the invention applied to such a type of pulley band expanding machine the motion of the lower wall 10 during the expansion of the pulley band is effected by the application of pressure through the orifice 36 of the cylinder 34. While certain embodiments of the invention have been described in detail, such embodiments are intended only as illustrations of the invention and not as limitations upon its scope, and various modifications in the details of construction of the device may be made by one skilled in the art, all of which are contemplated as falling within the scope and spirit of this invention. For an understanding of the scope of the invention, reference is made to the following claims.

Having thus described my invention, what I claim and desire to protect by Letters Patents is:

1. A vacuum box having end walls provided with apertures adapted to receive a pulley band, said end walls being mounted for relative movement parallel to the axis of the apertures, and separate means for limiting the maximum and minimum distances of separation of the end walls, said limiting means being simultaneously adjustable for varying the maximum and minimum distances of separation of the end walls.

2. A tire shaping machine comprising in combination a casing having end walls provided with apertures adapted to receive a pulley band, means for creating a differential fluid pressure on a pulley band positioned in the casing, one of said end walls being mounted for movement parallel to the axis of said apertures, readily adjustable means for determining the positions of maximum and minimum spacing of the movable wall with respect to the other wall, and means carried by the movable wall for cooperating with said position determining means.

3. A tire shaping machine comprising in combination a casing having end walls provided with apertures adapted to receive a pulley band, means for creating a differential fluid pressure on a pulley band positioned in the casing, one of said end walls being mounted for movement parallel to the axis of said apertures, means for determining the positions of maximum and minimum spacing of the movable wall with respect to the other wall, and preliminary adjusting means carried by the movable wall for cooperating with said position determining means, said position determining means being adjustable relative to the cooperating means.

4. A tire shaping machine comprising in combination a casing having end walls provided with apertures adapted to receive a pulley band, means for creating a differential fluid pressure on a pulley band positioned in the casing, one of said end walls being mounted for movement parallel to the axis of said apertures, adjustable means for determining the positions of maximum and minimum spacing of the movable wall with respect to the other wall, and means carried by the movable wall for cooperating with said position determining means, said cooperating means being adjustable relative to the position determining means.

5. A tire shaping machine comprising in combination a casing having end walls provided with apertures adapted to receive a pulley band, means for creating a differential fluid pressure on a pulley band positioned in the casing, one of said end walls being mounted for movement parallel to the axis of said apertures, means for determining the positions of maximum and minimum spacing of the movable wall with respect to the other wall, and means carried by the movable wall for cooperating with said position determining means, said position determining means and said cooperating means being adjustable relative to one another.

6. A tire shaping machine comprising in combination a casing having end walls provided with apertures adapted to receive a pulley band, means for creating a differential fluid pressure on a pulley band positioned in the casing, one of said end walls being mounted for movement parallel to the axis of said apertures, means for determining the positions of maximum and minimum spacing of the movable wall with respect to the other wall, and means carried by the movable wall for cooperating with said position determining means, and means for regulating the velocity of the motion of the movable end wall.

7. A tire shaping machine comprising in combination a casing having end walls provided with apertures adapted to receive a pulley band, means for creating a differential fluid pressure on a pulley band positioned in the casing, one of said end walls being mounted for movement parallel to the axis of said apertures, means for determining the positions of maximum and minimum spacing of the movable wall with respect to the other wall, and means carried by the movable wall for cooperating with said position determining means, said position determining means being adjustable relative to the cooperating means, and means for regulating the velocity of the motion of the movable end wall.

8. A tire shaping machine comprising in combination a casing having end walls provided with apertures adapted to receive a pulley band, means for creating a differential fluid pressure on a pulley band positioned in the casing, one of said end walls being mounted for movement parallel to the axis of said apertures, means for determining the positions of maximum and minimum spacing of the movable wall with respect to the other wall, and means carried by the movable wall for cooperating with said position determining means, said cooperating means being adjustable relative to the position determining means, and pneumatic means for regulating the velocity of the motion of the movable end wall.

9. A tire shaping machine comprising in combination a casing having end walls provided with apertures adapted to receive a pulley band, means for creating a differential fluid pressure on a pulley band positioned in the casing, one of said end walls being mounted for movement parallel to the axis of said apertures, means for determining the positions of maximum and minimum spacing of the movable wall with respect to the other wall, means carried by the movable wall for cooperating with said position determining means, and a support for the pulley band adjustably mounted on the movable end wall.

10. A tire shaping machine comprising in combination a casing having end walls provided with apertures adapted to receive a pulley band, means for creating a differential fluid pressure on a pulley band positioned in the casing, one of said end walls being mounted for movement parallel to the axis of said apertures, means for determining the positions of maximum and minimum spacing of the movable wall with respect to the other wall, means carried by the movable wall for cooperating with said position determining means, said position determining means being adjustable relative to the cooperating means, and a support for the pulley band adjustably mounted on the movable end wall.

11. A tire shaping machine comprising in combination a casing having end walls provided with apertures adapted to receive a pulley band, means for creating a differential fluid pressure on a pulley band positioned in the casing, one of said end walls being mounted for movement parallel to the axis of said apertures, separate means for determining the positions of maximum and minimum spacing of the movable wall with respect to the other wall, means carried by the movable wall for cooperating with said position determining means, said cooperating means being adjustable relative to the position determining means, and a support for the pulley band adjustably mounted on the movable end wall.

12. A tire shaping machine comprising in combination a casing having end walls provided with apertures adapted to receive a pulley band, means for creating a differential fluid pressure on a pulley band positioned in the casing, one of said end walls being mounted for movement parallel to the axis of said apertures, means for determining the positions of maximum and minimum spacing of the movable wall with respect to the other wall, means carried by the movable wall for cooperating with said position determining means, and means for moving the movable end wall to various positions intermediate its maximum and minimum positions at the will of the operator.

13. A tire shaping machine comprising in combination a casing having end walls provided with apertures adapted to receive a pulley band, means for creating a differential fluid pressure on a pulley band positioned in the casing, one of said end walls being mounted for movement parallel to the axis of said apertures, separate means for determining the positions of maximum and minimum spacing of the movable wall with respect to the other wall, means carried by the movable wall for cooperating with said position determining means, said position determining means being adjustable relative to the cooperating means, and means for moving the movable end wall to various positions intermediate its maximum and minimum positions at the will of the operator.

14. A tire shaping machine comprising in combination a casing having end walls provided with apertures adapted to receive a pulley band, means for creating a differential fluid pressure on a pulley band positioned in the casing, one of said end walls being mounted for movement parallel to the axis of said apertures, means for determining the positions of maximum and minimum spacing of the movable wall with respect to the other wall, means carried by the movable wall for cooperating with said position determining means, said cooperating means being adjustable relative to the position determining means, and means for moving the movable end wall to various positions intermediate its maximum and minimum positions at the will of the operator.

15. A tire shaping machine comprising in combination a casing having end walls provided with apertures adapted to receive a pulley band, means for creating a differential fluid pressure on a pulley band positioned in the casing, one of said end walls being mounted for movement parallel to the axis of said apertures, means for determining the positions of maximum and minimum spacing of the movable wall with respect to the other wall, and means carried by the movable wall for cooperating with said position determining means, said position determining means and said cooperating means being adjustable relative to one another, a support for the pulley adjustably mounted on the movable end wall, and means for regulating the velocity of the motion of the movable end wall and for moving the movable end wall to various positions intermediate its maximum and minimum positions at the will of the operator.

16. A vacuum box having top and bottom walls provided with apertures adapted to receive a pulley band, one of said walls being adjustable relative to the other parallel to the axis of the apertures, a platform for supporting a pulley band within the vacuum box carried by the movable wall, said platform being mounted for adjustment in a direction parallel to the axis of the apertures.

Signed at Columbiana, county of Columbiana, State of Ohio, this 20 day of May, 1929.

ALLEN L. HESTON.